United States Patent
Lu et al.

(10) Patent No.: US 9,250,466 B2
(45) Date of Patent: Feb. 2, 2016

(54) TRANSREFLECTIVE COLOR FILTER AND METHOD FOR MANUFACTURING THE SAME AND LIQUID CRYSTAL DISPLAY DEVICE

(71) Applicant: BOE TECHNOLOGY GROUP CO., LTD., Beijing (CN)

(72) Inventors: Jinbo Lu, Beijing (CN); Jisheng Zhao, Beijing (CN); Jianshe Xue, Beijing (CN); Chen Liu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 169 days.

(21) Appl. No.: 13/703,119

(22) PCT Filed: Oct. 10, 2012

(86) PCT No.: PCT/CN2012/082712
§ 371 (c)(1),
(2) Date: Dec. 10, 2012

(87) PCT Pub. No.: WO2013/060236
PCT Pub. Date: May 2, 2013

(65) Prior Publication Data
US 2014/0078452 A1 Mar. 20, 2014

(30) Foreign Application Priority Data
Oct. 24, 2011 (CN) .......................... 2011 1 0326097

(51) Int. Cl.
*G02F 1/1335* (2006.01)
*G02B 5/20* (2006.01)
*G02B 5/22* (2006.01)

(52) U.S. Cl.
CPC .......... *G02F 1/133514* (2013.01); *G02B 5/201* (2013.01); *G02B 5/22* (2013.01); *G02F 1/133516* (2013.01); *G02F 1/133555* (2013.01)

(58) Field of Classification Search
CPC ...................... G02F 1/133514; G02F 1/133555
USPC .................................................. 349/106, 114
See application file for complete search history.

(56) References Cited

U.S. PATENT DOCUMENTS 6,542,209 B2 4/2003 Kim et al.
8,187,776 B2* 5/2012 Tsao et al. .................. 430/7
(Continued)

FOREIGN PATENT DOCUMENTS

CN 1417626 A 5/2003
CN 1503011 A 6/2004
(Continued)

OTHER PUBLICATIONS

International Search Report mailed Jan. 10, 2013; PCT/CN2012/082712.
(Continued)

*Primary Examiner* — Richard Kim
*Assistant Examiner* — Kendrick Hsu
(74) *Attorney, Agent, or Firm* — Ladas & Parry LLP

(57) ABSTRACT

The invention provides a transreflective color filter and a method for manufacturing the same, and a liquid crystal display device. The transreflective color filter comprises a substrate and color resin layers formed on the substrate, wherein the color resin layers include transmissive portions and reflective portions, regions of the substrate corresponding to the transmissive portions have concaves formed therein, and a part of the transmissive portion fills the concave.

15 Claims, 2 Drawing Sheets

(56) References Cited

U.S. PATENT DOCUMENTS

| | | |
|---|---|---|
| 2003/0090610 A1 | 5/2003 | Ozeki et al. |
| 2004/0119921 A1 | 6/2004 | Chang et al. |
| 2004/0146791 A1 | 7/2004 | Sakurada et al. |
| 2005/0046769 A1* | 3/2005 | Yi et al. .................. 349/106 |
| 2007/0064179 A1 | 3/2007 | Park et al. |
| 2008/0030658 A1 | 2/2008 | Matsuhita |
| 2010/0073614 A1* | 3/2010 | Fujioka et al. ............ 349/114 |
| 2012/0181557 A1 | 7/2012 | Kim et al. |

FOREIGN PATENT DOCUMENTS

| | | |
|---|---|---|
| CN | 1936660 A | 3/2007 |
| CN | 101023380 A | 8/2007 |
| CN | 101369076 A | 2/2009 |
| CN | 102156368 A | 8/2011 |
| CN | 102707355 A | 10/2012 |
| TW | I315009 B | 9/2009 |

OTHER PUBLICATIONS

First Chinese Office Action dated Sep. 22, 2013; Appln. No. 201110326097.1.

Third Chinese Office Action dated Jun. 20, 2014; Appln. No. 201110326097.1.

Chinese Rejection Decision Appln. No. 201110326097.1; Dated Sep. 12, 2014.

* cited by examiner

TRANSREFLECTIVE COLOR FILTER AND METHOD FOR MANUFACTURING THE SAME AND LIQUID CRYSTAL DISPLAY DEVICE

TECHNICAL FIELD

Embodiments of the invention relate to a transreflective color filter and a method for manufacturing the same, and a liquid crystal display device.

BACKGROUND

Transreflective color filters may be used widely in liquid crystal display devices, for example liquid crystal color panels in mobile products such as a cellphone, since they can provide color images with high brightness and high quality in indoor and outdoor environments. In the indoor environment, white light of a backlight source is transmitted through the transreflective color filters to realize bright color images; and in the outdoor environment, sunlight enters the transreflective color filters and then is reflected, and thereby relative bright color images can also be obtained. In order to obtain color images with high brightness and high quality in both of bright and dark environments (e.g., outdoor and indoor environments), considerations should be given to both the reflection property and transmission property of the transreflective color filter at the same time, and both of the properties require the brightness and the color saturation as high as possible. The brightness and the color saturation contradict with each other: increasing the thickness of a color film can increase the color saturation, but the brightness will be reduced because of increase of absorption; and decreasing the thickness of the color film can increase the brightness, but the color saturation will be reduced. Therefore, how to balance the brightness and the color saturation reasonably becomes an important factor in improving the property of the transreflective color filter.

SUMMARY

One embodiment of the invention provides a transreflective color filter, which comprises: a substrate; and color resin layers formed on the substrate, wherein the color resin layers include transmissive portions and reflective portions, regions of the substrate corresponding to the transmissive portions have concaves formed therein, and a part of the transmissive portion fills the concave.

Another embodiment of the invention provides a liquid crystal display device, which includes a transreflective color filter comprising: a substrate; and color resin layers formed on the substrate, wherein the color resin layers include transmissive portions and reflective portions, regions of the substrate corresponding to the transmissive portions have concaves formed therein, and a part of the transmissive portion fills the concave.

Still another embodiment of the invention provides a method for manufacturing a transreflective color filter, which comprises: forming concaves on a substrate; and forming color resin layers on the substrate, wherein the color resin layers include transmissive portions and reflective portions, locations of the transmissive portions correspond to the concaves, and a part of the transmissive portion fills the concave.

1 a glass substrate; 2 a black matrix pattern; 3 a red pixel resin layer; 4 a green pixel resin layer; 5 a blue pixel resin layer; 6 a concave; 7 a planarization layer; 8 a transparent electrode layer; 9 a transmissive portion; 10 a reflective portion.

DETAILED DESCRIPTION OF EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Embodiments of the invention provide a transreflective color filter and a method for manufacturing the same, which can reduce the thickness of the color filter while balancing the brightness and the color saturation of the transreflective color filter. In addition, embodiments of the invention provide a liquid crystal display device, which includes the transreflective color filter and an array substrate.

The transreflective color filter provided by an embodiment of the invention will be described hereinafter with reference to FIGS. 1 and 2.

Figure 1:
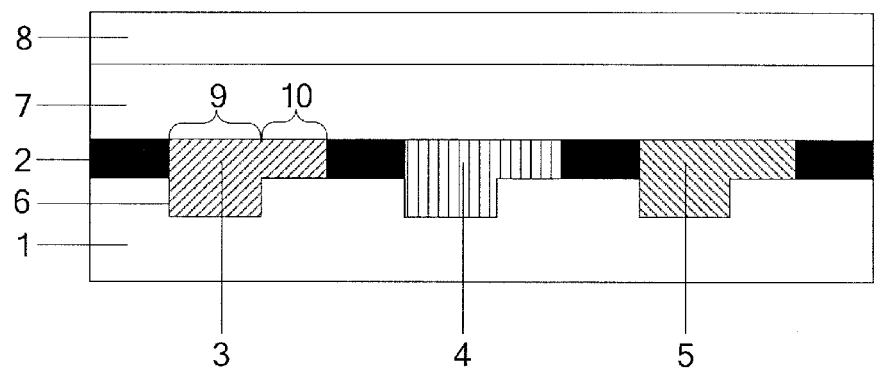
FIG. 1 is a lateral cross-section view showing a transreflective color filter in an embodiment of the invention.
Figure 2:
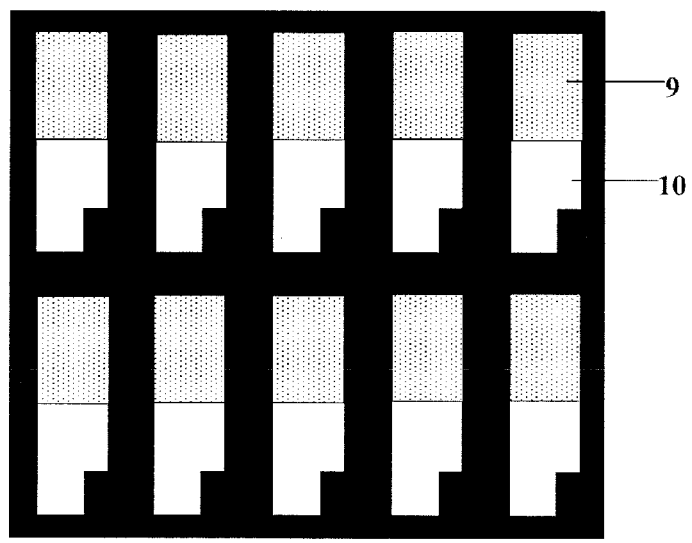
FIG. 2 is a plan view showing a transreflective color filter in an embodiment of the invention after a black photoresist and concaves are formed thereon.

FIG. 1 is a lateral cross-section view of a transreflective color filter in an embodiment of the invention, and FIG. 2 is a plan view of a transreflective color filter in an embodiment of the invention after a black photoresist and concaves are formed thereon. With reference to FIGS. 1 and 2, the transreflective color filter in the embodiment of the invention includes for example: a transparent substrate 1; a black matrix pattern 2 disposed on the transparent substrate 1; a red pixel resin layer 3, a green pixel resin layer 4, and a blue pixel resin layer 5 formed through the black matrix pattern 2; a planarization layer 7 covering the black matrix pattern 2 and the resin layers 3, 4, and 5; and a transparent electrode layer 8 disposed on the planarization layer 7.

In embodiments of the invention, for example, the red, green, and blue color resin layers each include a transmissive portion 9 and a reflective portion 10. The regions of the transparent substrate 1 corresponding to the transmissive portions 9 have concaves 6 formed therein, and a part of the transmissive portion 9 fills the concave 6, so that the thickness of the transmissive portion 9 is larger than the thickness of the reflective portion 10.

In embodiments of the invention, for example, the thickness of the black matrix pattern 2 is a value in a range of 1 μm to 5 μm, the area ratio of the transmissive portion 9 to the reflective portion 10 is a value in a range of 1:1 to 9:1, the depth of the concave 6 is a value in a range of 0.5 μm to 3 μm, and the ratio of the thickness of the reflective portion 10 to the thickness of the transmissive portion 9 is a value in a range of 1:3 to 1:2.

In some embodiments of the invention, the transparent substrate 1 is a glass substrate, for example. In other embodiments of the invention, the transparent substrate 1 may also be a quartz substrate, a plastic substrate, or the like.

In embodiments of the invention, the transparent electrode layer 8 may be, for example, Indium Tin Oxide (ITO), Indium Zinc Oxide (IZO), or other transparent conductive material.

A method for manufacturing a transreflective color filter provided by an embodiment of the invention will be described hereinafter with reference to FIG. 3.

Figure 3:
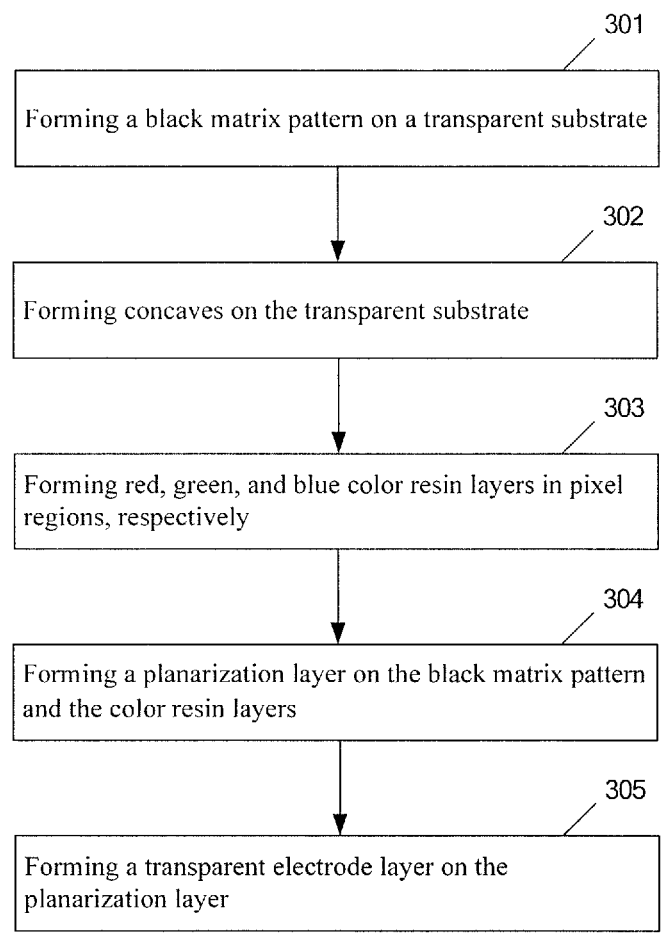
FIG. 3 is a flowchart showing a method for manufacturing a transreflective color filter in an embodiment of the invention.

FIG. 3 is a flowchart showing a method for manufacturing a transreflective color filter in an embodiment of the invention. With reference to FIG. 3, the method for manufacturing the transreflective color filter in the embodiment of the invention includes for example following steps:

Step 301, a black matrix pattern is formed on a transparent substrate to define pixel regions;

In embodiments of the invention, for example, a layer of photoresist is applied to a transparent substrate (for example, a glass substrate) by spin coating to form a black matrix layer, and then portions of the black matrix layer corresponding to the pixel regions are removed by a patterning process (including, for example, exposing, developing, etching, etc.) to obtain the black matrix pattern. In the embodiment of the invention, for example, the thickness of the black matrix pattern is a value in a range of 1 μm to 5 μm; however, embodiments of the invention are not limited thereto.

Step 302, concaves are formed on the transparent substrate, on which the black matrix pattern is formed, and locations of the concaves correspond to transmissive portions of color resin layers in the pixel regions;

In embodiments of the invention, for example, a layer of photoresist is applied to the transparent substrate, on which the black matrix pattern is formed, by spin coating, and the photoresist corresponding to the transmissive portions is removed by a photolithographic process (including, for example, exposing, developing, etc.) to form a photoresist pattern, so that an area ratio of the transmissive portion to a reflective portion in the pixel region is a value in a range of 1:1 to 9:1. Thereafter. portions of the transparent substrate corresponding to the transmissive portions are removed by an etching (for example a dry etching or a wet etching) using the photoresist pattern as a mask, to form the concaves having a depth of 0.5 μm~3 μm; and then the photoresist pattern is removed to obtain the transparent substrate on which the black matrix pattern and the concaves are formed (as shown in FIG. 2).

Step 303, red, green, and blue color resin layers are formed in the pixel regions, respectively;

In embodiments of the invention, red pixel resin is coated on the transparent substrate on which the black matrix pattern and the concaves are formed, and a patterning process (including, for example, exposing, developing, etching, planarization, etc) is performed so as to obtain a red pixel resin layer which fills the concave and is formed through the black matrix pattern. Green and blue resin layers may be obtained by repeating the above steps. In the embodiment of the invention, a ratio of the thickness of the reflective portion to the thickness of the transmissive portion is a value in a range of 1:3 to 1:2; however, embodiments of the invention are not limited thereto.

Step 304, a planarization layer is formed on the black matrix pattern and the color resin layers;

In embodiments of the invention, for example, a planarization layer is formed on the black matrix pattern and the color resin layers by processes such as coating, baking, and so on, and the planarization layer covers the black matrix pattern and the color resin layers.

Step 305, a transparent electrode layer is formed on the planarization layer.

In embodiments of the invention, a transparent electrode layer is formed by for example a sputtering process, so that the transreflective color filter (as shown in FIG. 1) is obtained.

It should be noted that the black matrix pattern is formed firstly on the transparent substrate and then the concaves are formed in the above embodiments of the invention; however, embodiments of the invention are not limited thereto. For example, in other embodiments of the invention, the sequence of the above steps 301 and 302 may be reversed according to particular process conditions. That is, the concaves may be formed firstly on the transparent substrate, and then the black matrix pattern is formed.

It should also be noted that the black matrix is disposed in the transreflective color filter in the above embodiments of the invention; however, the embodiments of the invention are not limited thereto. For example, in other embodiments of the invention, the transreflective color filter may have no black matrix be disposed therein, but the black matrix is disposed in the array substrate. In this case, the step 301 (i.e., the step of forming the black matrix pattern) in the above embodiments may be omitted; and the concaves may be formed on the transparent substrate directly, and then the color resin layers are formed on the transparent substrate on which the concaves are formed and the transmissive portions of the color resin layers correspond to the locations of the concaves to fill the concaves.

It should also be noted that, in the above embodiments of the invention, the transreflective color filter includes the planarization layer and the transparent electrode layer; however, embodiments of the invention are not limited thereto. For example, in other embodiments of the invention, the transreflective color filter for a lateral electric field type liquid crystal panel may include the planarization layer, but not have the transparent electrode layer, and in this case, the step 305 (i.e., the step of forming the transparent electrode layer) in the above embodiments may be omitted; and the transreflective color filter for a twisted nematic type liquid crystal panel may include the transparent electrode layer, but the planarization layer is optional, and in this case, the step 304 (i.e., the step of forming the planarization layer) in the above embodiments is optional and may be omitted according to particular situations.

In summary, in embodiments of the invention, it is possible to adjust the different thicknesses of the reflective and transmissive portions of the color resin layers by forming the concaves in the regions of the transparent substrate corresponding to the transmissive portions of the color resin layers, which makes the thickness of the reflective portions of the color resin layers smaller than that of the transmissive portions, so as to reduce the path of the reflected light. As a result, not only the problem is solved effectively that the brightness and the color saturation of the transreflective color filter are difficult to be balanced, but also the thickness of the color filter is reduced since the concaves are formed on the transparent substrate, which benefits its use in light and slim electronic products.

The forgoing embodiments are merely used to explain the technical solutions of the invention, but not limitations on them. Although the invention is described in detail with reference to the above embodiments, as would be appreciated by those ordinarily skilled in the art, they can make modifications to the technical solutions recorded by the above embodiments or make equivalent replacements to a part of technical features therein; and these modifications or replacements do not make the essence of a corresponding technical solution departing from the spirit and scope of the present disclosure.

The invention claimed is:

1. A transreflective color filter comprising:
   a substrate; and
   color resin layers formed on the substrate,
   wherein the color resin layers include transmissive portions and reflective portions, regions of the substrate corresponding to the transmissive portions have concaves formed therein, and a part of the transmissive portion fills the concave;
   a black matrix pattern formed on the substrate to define pixel regions,
   wherein a top surface of the black matrix pattern and top surfaces of the transmissive and reflective portions are in same horizontal plane, and a thickness of the black matrix pattern is same as a thickness of the reflective portion and is smaller than a thickness of the transmissive portion, and
   wherein the color resin layer is formed through the black matrix pattern in the pixel region.

2. The transreflective color filter according to claim 1, further comprising:
   a planarization layer formed on the color resin layers; and
   a transparent electrode layer formed on the planarization layer.

3. The transreflective color filter according to claim 1, further comprising:
   a planarization layer formed on the color resin layers and the black matrix; and
   a transparent electrode layer formed on the planarization layer.

4. The transreflective color filter according to claim 1, wherein the depth of the concave is in a range from 0.5 μm to 3 μm.

5. The transreflective color filter according to claim 1, wherein a thickness ratio of the reflective portion to the transmissive portion is in a range from 1:3 to 1:2.

6. The transreflective color filter according to claim 1, wherein an area ratio of the reflective portion to the transmissive portion is in a range from 1:9 to 1:1.

7. A liquid crystal display device including a transreflective color filter, the transreflective color filter comprising:
   a substrate; and
   color resin layers formed on the substrate,
   wherein the color resin layers include transmissive portions and reflective portions, regions of the substrate corresponding to the transmissive portions have concaves formed therein, and a part of the transmissive portion fills the concave;
   wherein the transreflective color filter further comprises:
   a black matrix pattern formed on the substrate to define pixel regions,
   wherein a top surface of the black matrix pattern and top surfaces of the transmissive and reflective portions are in same horizontal plane, and a thickness of the black matrix pattern is same as a thickness of the reflective portion and is smaller than a thickness of the tranemissive portion, and
   wherein the color resin layer is formed through the black matrix pattern in the pixel region.

8. The liquid crystal display device according to claim 7, wherein the transreflective color filter further comprises:
   a planarization layer formed on the color resin layers; and
   a transparent electrode layer formed on the planarization layer.

9. The liquid crystal display device of claim 7, wherein the transreflective color filter further comprises:
   a planarization layer formed on the color resin layers and the black matrix; and
   a transparent electrode layer formed on the planarization layer.

10. A method for manufacturing a transreflective color filter, which comprises:
    forming concaves on a substrate; and
    forming color resin layers on the substrate, wherein the color resin layers includes transmissive portions and reflective portions, locations of the transmissive portions corresponds to the concaves, and a part of the transmissive portion fills the concaves,
    forming a black matrix pattern on the substrate to define pixel regions,
    wherein a top surface of the black matrix pattern and top surfaces of the transmissive and reflective portions are in same horizontal plane, and a thickness of the black matrix pattern is same as a thickness of the reflective portion and is smaller than a thickness of the transmissive, and
    wherein the color resin layer is formed through the black matrix pattern in the pixel region.

11. The method for manufacturing the transreflective color filter according to claim 10, further comprising:
    forming a planarization layer on the color resin layers; and
    forming a transparent electrode layer on the planarization layer.

12. The method for manufacturing the transreflective color filter according to claim 10, further comprising:
    forming a planarization layer on the color resin layers and the black matrix pattern; and
    forming a transparent electrode layer on the planarization layer.

13. The method for manufacturing the transrefiective color filter according to claim 10, wherein a depth of the concave is in a range from 0.5 μm to 3 μm.

14. The method for manufacturing the transreflective color filter according to claim 10, wherein a thickness ratio of the reflective portion to the transmissive portion is in a range from 1:3 to 1:2.

15. The method for manufacturing the transreflective color filter according to claim 10, wherein an area ratio of the reflective portion to the transmissive portion is in a range from 1:9 to 1:1.

* * * * *